United States Patent

[11] 3,602,684

[72] Inventor Richard G. Friess
San Marcos, Calif.
[21] Appl. No. 869,529
[22] Filed Oct. 27, 1969
[45] Patented Aug. 31, 1971
[73] Assignee Hughes Aircraft Company
Culver City, Calif.

[54] CONSTANT-TEMPERATURE-PULSED THERMOCOMPRESSION BALL BONDER SYSTEM
13 Claims, 16 Drawing Figs.

[52] U.S. Cl. 219/110, 219/85, 219/497
[51] Int. Cl. B23k 11/24
[50] Field of Search 219/109, 110, 121, 497, 499, 501; 323/85; 29/498; 228/9

[56] References Cited
UNITED STATES PATENTS

| | | | |
|---|---|---|---|
| 3,275,802 | 9/1966 | Vandiver et al. | 219/499 |
| 3,263,057 | 7/1966 | Conti | 219/85 X |
| 3,441,708 | 4/1969 | Gilbert | 219/110 |
| 3,497,664 | 2/1970 | Vanderhelst | 219/110 |

*Primary Examiner*—J. V. Truhe
*Assistant Examiner*—J. G. Smith
*Attorneys*—James K. Haskell and Joseph P. Kates ABSTRACT: A pulsed thermocompression bonder is provided comprising a bonding or capillary tip and an electronics system to regulate the bonding or capillary tip temperature. A switch automatically provides a start bond signal when the operator lowers the bonder tip to bonding position to commence a bonding operation. The start bond signal activates an AC control circuit which causes current flow in a heating transformer until the tip is at predetermined bonding or operating temperature. The AC control circuit then stops current flow from being supplied to the heating transformer for a predetermined cooling time. In subsequent sequential periods iteratively the current is allowed to flow to the heating transformer until a predetermined temperature is reached and is cut off for the predetermined period of cooling. Adjustment means are provided to regulate off-and-on current time so that once the predetermined desired temperature is reached an approximately constant desired temperature or flat heat curve is obtained until the end of the bonding operation. A sensing circuit connected to the bonder tip senses a rise in voltage due to an increase in tip resistance when the tip is being heated to the predetermined bonding temperature. After rising to desired predetermined temperature the sensing circuit (1) triggers a timing one shot multivibrator which sets and resets an on-off flip-flop circuit to regulate the heating cycle duration for a given bonding operation and (2) triggers an on-off one-shot multivibrator each time the predetermined temperature is reached in the heating cycle. The voltage outputs of the on-off flip-flop and one-shot multivibrator circuits are mixed and applied to the AC control circuit. The on-off one-shot multivibrator stops current flow to the heating transformer for the predetermined period upon each sensing of reaching the predetermined operating temperature during the bonding cycle. The on-off flip-flop as determined by the timing one shot multivibrator changes state and terminates the bonding cycle.

INVENTOR.
RICHARD G. FRIESS,
BY
Joseph P. Kates
ATTORNEY.

CONSTANT-TEMPERATURE-PULSED THERMOCOMPRESSION BALL BONDER SYSTEM

CROSS-REFERENCES TO RELATED APPLICATIONS

The system of the present invention is employable with the invention illustrated and described in the Design Patent Application Ser. No. D19,408 for Bonder of William H. Hill and Robert C. Botting, filed Oct. 3, 1969, further identified as PD–69324 and assigned to the assignee of the present invention.

BACKGROUND OF THE INVENTION

1. Field of the Invention

The invention relates to a wire-bonding apparatus. More particularly, the invention relates to a wire thermocompression bonder which operates on pulsed heat principles and which is utilizable in bonding large, fine and ultrafine wire and ribbons in providing leads and in stitching between components including thick or thin film devices of electronic assemblies, for example, large scale integration, hybrid and other types of circuits and assemblies.

2. Description of the Prior Art

There are many patents and considerable other literature, catalogs, etc. on prior art wire- and lead-bonding apparatus. To enumerate the patent numbers or identification of disadvantageous features of any one or a group of patented or unpatented products is not in order since they all have disadvantages which the present invention overcomes and they lack the advantageous features of this invention. The best of the previously known machines is that of applicant's assignee, namely the Micro Pulse Thermocompression Ball Bonder Model MCW/BB of the Hughes Aircraft Company, Welder Department, 2020 Oceanside Boulevard, Oceanside, California 92054. This device is also economical in cost and operation, has many fine features, and is suitable for many applications. However, generally, and particularly for the purposes or objects of the present invention, prior art devices present many problems. For example, they make no provision for heating to a predetermined controlled temperature suitable for the work. They do not provide continuous control of the temperature to maintain it constant over the operating cycle. The workpiece itself is required to be heated by prior art devices. This often causes damage or unwanted change in physical, including electrical, characteristics of the circuit components to which bonding of leads or connection is made by the apparatus. They do not provide for regulation of temperature range limitations. Prior art bonders do not make adequate provision for momentary heating and for regulation of duration and peak temperature of the momentary heating to protect the workpiece. The prior art devices are too complex and cumbersome. They employ complex circuitry and very large single power supplies. Provision for AC line variation and deviation is not provided in prior art devices. They do not provide continuous regulation and prevention from exceeding of the peaks of heating energy permitted.

SUMMARY

The system of the invention comprises means illustrated as electronic circuits which implement applicant's discovery of the physical phenomena and relationship that when the temperature of certain substances such as those employable as the capillary tip material of a bonder are changed, there results a functionally related change in the volume resistivity of the material. Applicant has further discovered that the change in volume resistivity can be measured as a function of the change in temperature and can be detected. Appreciating these physical phenomena and physical property interrelationships, applicant has further implemented this with the inventive means wherein bonding is effected economically and in a superior manner and without dangering the work.

For example, in the illustrative embodiment, applicant provides (1) circuit means to initiate heating of the capillary tip to predetermined bonding temperature when the AC control circuit is activated, (2) a circuit to sense the voltage and it changes across the capillary tip corresponding to a given temperature and changes thereof, (3) electrical circuits responsive to the circuit to sense the voltage and its changes to control the duration of the heating cycle, and within the heating cycle duration to restore desired temperature upon deviations therefrom. These circuits provide heat to establish and maintain temperatures suitable for the particular capillary tip material, the work being operated on and other physical ambient characteristics and correspondingly to effect or enable heating only until desired level of temperature is reached, to cut off for a period until the temperature goes below the desired permitted lower range of temperature and to continuously restore and maintain a constant level of desired temperature throughout the duration of a bonding cycle. Thus, circuits are provided which operate over the entire period of the heating cycle of a pulsed thermocompression bonder to enable continuous capillary tip volume resistivity sampling, and corresponding heating and cooling periods so as to maintain a substantially constant desired temperature and desired tip operating level over the entire heating cycle. More specifically, the illustrative embodiment of the invention comprises a sensing circuit which continuously senses the voltage across the bonding or capillary tip corresponding to a function of the temperature, an on-off flip-flop circuit, automatic means operative upon lowering the tip to the work to set the bonding operation wherein the flip-flop circuit is set to provide a durational on period. An on-off one-shot multivibrator pulsing means is provided. The outputs of the on-off flip-flop and of the on-off one-shot multivibrator output are combined so that an AC control circuit is activated by a start bond voltage and in subsequent periods wherein both outputs are providing appropriate input voltage to the control circuit. When activated the AC control circuit enables the heating transformer to heat the capillary tip. The AC control circuit includes the feature of a special compensating regulating circuit for the AC line voltage which when the line voltage varies appreciably, compensates for the additional voltage applied to the heating transformer by changing the operating current angle of the AC control circuit such that the peak to peak current applied to the capillary tip is held constant.

Thus the specific circuitry of the illustrative embodiment implementing the invention comprises a sense circuit responsive to the capillary tip volume resistivity and which specifically measures the voltage drop across the tip, a timing one-shot multivibrator and an on-off one-shot multivibrator responsive to the sense circuit, an on-off flip-flop responsive to the timing one-shot multivibrator to cause a durational heating durational pulse wave between start bond and end of bond, and a mixing circuit responsive to actuation of both the on-off flip-flop and the on-off one-shot multivibrator to enable an AC control circuit. The AC control circuit controls the heating transformer to cause intermittent but constant heating over the heating cycle. A special DC regulated supply means are provided which feeds line voltage directly to the AC control circuit, provides the proper regulated pulse voltages to the AC control circuit, and provides the remaining power supplies necessary to operate the illustrative embodiment system. Timing adjustment and adjustable sense level means are provided to enable regulation of the duration of the cycle and to enable adjustment of the desired temperature at which the capillary tip is permitted to operate.

The present invention overcomes the disadvantages of prior art devices and solves the problems pointed out in the next preceding section and provides additional features and advantages. For example, the present invention provides advantages of controllable constant temperature, for any desired period of time, it provides for relatively momentary heating insuring that at no time is too much heat transferred into the workpiece by virtue of the constant level continuous cooling off and heating to maintain a constant heating level, the circuit of the invention is simple in contradistinction to those of prior art devices. In the prior art a large single power supply was required. However, in the present invention, provision only of a heating transformer, an AC control circuit and a small circuit card containing the various sensing and timing voltage circuits enables a small power supply to be utilized. Other simplifications are provided in the invention by enabling direct off-the-line operation of the control circuit and simultaneous control of the heating despite variations in the input AC control line voltage by automatically controlling the operating point conduction angle and also the amount of current permitted to flow through the primary of the heating transformer.

BRIEF DESCRIPTION OF THE DRAWINGS

FIG. 4 is a diagrammatic representation of system waveforms illustrating the sequence of operation in the preferred illustrative embodiment of FIG. 1 and wherein:

FIG. 4(*a*) represents the "start bond" pulse on the base of one stage of the on-off flip-flop circuit;

FIG. 4(*b*) represents the voltage waveform at the collector of the other stage of the on-off flip-flop circuit;

FIG. 4(*c*) represents the end of bond pulse;

FIG. 4(*d*) represents the AC control circuit output obtained upon adjustment of the conduction angle potentiometer by the operator for proper conduction angle of its silicon-controlled rectifier;

FIG. 4(*e*) represents the voltage across the capillary tip shown in the illustrative embodiment of FIGS. 1 and 2;

FIG. 4(*f*) represents the sense voltage at the base of the sense circuit Schmitt trigger input transistor and wherein the upper level ($e_2$) is determined by the setting of the adjustable sense level potentiometer and wherein the limits of adjustment by way of illustration are between the voltage level ($e_1$) and the voltage level ($e_2$);

FIG. 4(*g*) represents the output pulses from the output sense circuit transistor collector;

FIG. 4(*h*) represents the waveform at the collector of the output stage of the on-off one-shot multivibrator circuit;

FIG. 4(*i*) is a representation of the timing waveform at the collector of the output stage of the timing one-shot multivibrator and wherein the length of the waveform may vary, for example, from 0.1 seconds to 3 seconds as determined by the adjustment of the timing adjustment potentiometer;

FIG. 4(*j*) is a representation of a cycle of the capillary tip temperature which could have an arbitrary operating setting as shown by the dashed and solid lines representing 200° and 1,000° Fahrenheit, respectively;

FIG. 4(*k*) is a representation of the added or summed mixed pulse at the junction of the collector resistors at the output of the on-off one-shot multivibrator and the on-off flip-flop; and FIG. 4(*l*) is a waveform representation of a single cycle of the silicon-controlled rectifier output wherein the shaded areas illustrate the conduction angle as set by the operator and modified by line voltage variation and wherein is further illustrated the action of the AC control circuit in modifying the firing conduction angle of the SCR's to provide a substantially constant peak transformer voltage and hence protect the capillary tip.

DESCRIPTION OF THE PREFERRED EMBODIMENT

Thermocompression Bonder System

Figure 1:
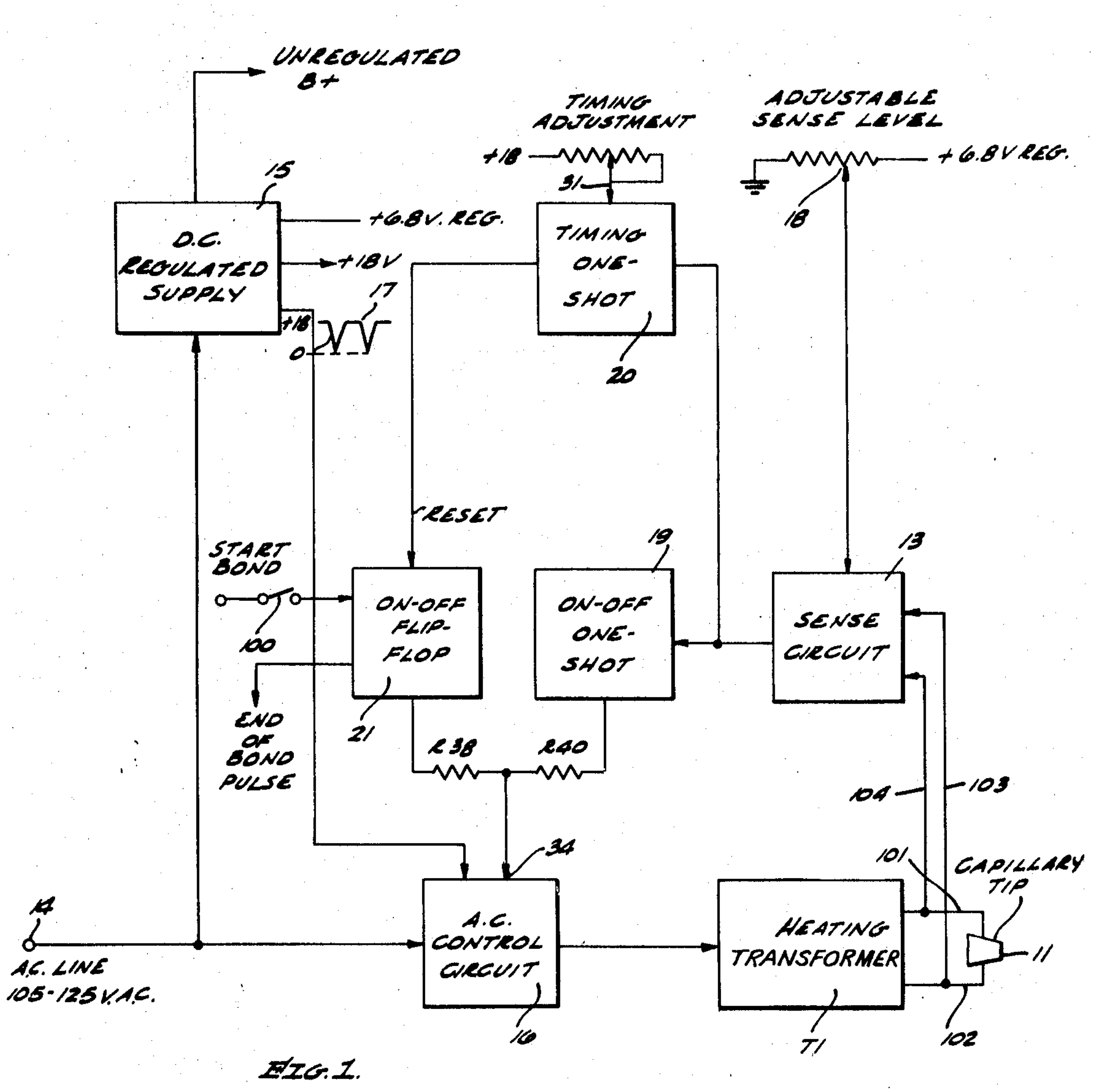
FIG. 1 is a partially block and partially schematic diagrammatic representation illustrating a capillary tip and sense, timing, on-off flip-flop, on-off one-shot multivibrator, summing, AC control, heating transformer and power supply circuits, timing and sense level adjustment networks, a start bond switch, and an AC control circuit input waveform from the power supply circuit in a first preferred illustrative embodiment of the constant temperature pulsed heat thermocompression wire ball bonder system of the invention.

Refer to FIG. 1. On the thermocompression bonder of this preferred illustrative embodiment of the invention is provided a capillary tip 11. In the system there is also provided the required waveforms and heating power for the capillary tip 11. The system of the invention may be employed in Thermocompression Bonding Apparatus. For example, a suitable bonder in which the invention is employable is the Hughes Pulsed Thermocompression Bonder available from the Hughes Aircraft Company, Welder Department, 2020 Oceanside Boulevard, Oceanside, California 92054, designated Model HPB-360 and illustrated in their catalog TC-1. In the system of the invention an advanced three-channel feedback AC power source permits digital selection of the bonding or capillary tip 11 temperature and of the time period or work cycle during which the tip 11 remains at a particular temperature. The essential physical and metallurgical determinants of thermocompression bonding are thus subject to direct control. Basic circuits are provided comprising an AC control circuit 16; a temperature-sensing circuit 13; a timing circuit comprising a timing one-shot multivibrator 20 and an on-off flip-flop 21; an on-off one-shot multivibrator 19; and a DC regulated power supply unit 15. A heating transformer T1 is provided and connected to the output of the AC control circuit 16. The heating transformer T1 may be a conventional stepdown power transformer capable of handling peak currents of about 100 amps.

When the capillary tip 11 reaches a predetermined force, the bonding power supply is turned on for the bonding schedule engaged. The capillary tip or bonding tip 11 consists of two shanks bonded together but insulated from each other. This tip is made of a material with relatively high electrical and thermal conductivity to provide short heating and cooling times.

The temperature-sensing circuit 13 senses the voltage drop across the capillary tip 11 of the thermocompression bonder. I have discovered that a functional relationship of the change of resistivity of the materials of which capillary tip 11 is formed with respect to changes in temperature can be implemented by providing a system which is sensitive primarily to this relationship of change of resistivity with change of temperature. Grounding and low-voltage, high-power capillary tip leads 101 and 102 connect opposite sides of capillary tip 11 to the heating transformer T1. A pair of additional leads 103 and 104 are provided. Additional leads 103 and 104 are tapped off of the capillary tip leads 101 and 102 and are connected to the input to sense circuit 13. From a source of AC line voltage 14, which may be 105 to 125 volts (or alternatively a 200 volts AC power supply source), operated at about 50 to 60 cycles, the AC power input is applied to the DC regulated power supply unit 15. The AC line power source 14 is also connected to the input to the AC control circuit 16.

DC regulated supply unit 15 provides a regulated positive (+) 18 volts output for a purpose to be described.

In addition to the said +18 volt regulated DC level output, the DC regulated supply 15 provides a regulated +6.8 volt DC level output and supplies input to the AC control circuit 16 comprising a full-wave voltage waveform 17, the upper output level of which is clipped at a regulated +18 volts DC. The waveform 17 input to AC control circuit 16 synchronizes with the input from AC input source 14 to actuate AC control circuit 16. In the description herein, the term "actuate" will be employed to describe the enabling of a circuit when a signal or signals are presented at a circuit input less than all of the signals which are together required to activate the circuit and the term "activate" will be employed to designate the operation of a circuit when all signals necessary to operate the circuit are present.

The sense circuit 13 is essentially of the type conventionally known as a Schmitt trigger circuit. An adjustable sense level potentiometer 18 is provided to set the voltage wherein the Schmitt trigger circuit 13 will fire at the required point. The resistance portion of potentiometer 18 is connected between the +6.8 volt regulated supply from DC regulated supply 15 and ground. Coupled responsive to the output of the sense circuit 13 are on-off one-shot multivibrator 19 and a timing one-shot multivibrator 20. A timing adjustment rheostat 31 may be provided and connected to the timing one-shot multivibrator 20. One end of the resistance portion of timing adjustment rheostat 31 is connected to the +18 volt regulated supply from DC regulated supply 15. Timing adjustment rheostat 31 regulates the RC time constant of the timing one-shot multivibrator 20. On-off flip-flop circuit 21 is coupled to the output of and triggered to reset by the timing one-shot multivibrator 20. A microswitch 100 may be provided and located in the above-described thermocompression bonder. This microswitch 100 is connected and positioned to operate when the capillary tip 11 is resting on the work ready to bond. Operation of microswitch 100 sets or starts the heat weld cycle trigger by turning on or setting the on-off flip-flop 21. The on-off flip-flop 21 is reset or turned off by the pulse input from the timing one-shot multivibrator 20. An on-off flip-flop circuit 21 output resistor R38 and an on-off one-shot multivibrator 19 output resistor R40 are provided in the sensing and timing circuit 13, 19, 20 and 21. One end of resistor R38 is coupled to the output of the on-off flip-flop 21. One end of resistor R40 is coupled to the output of the on-off one-shot multivibrator 19. Resistors R38 and R40 are joined together at their ends opposite those separately connected to flip-flop 21 and multivibrator 19. The junction of resistors R38 and R40 is coupled at input 34 to the input of the AC control circuit 16. Resistors R38 and R40 form a mixing circuit to mix the output of the on-off flip-flop 21 and the on-off one-shot multivibrator 19 to regulate the AC control circuit 16 in a manner to be described.

SYSTEM OPERATION

Figure 4:
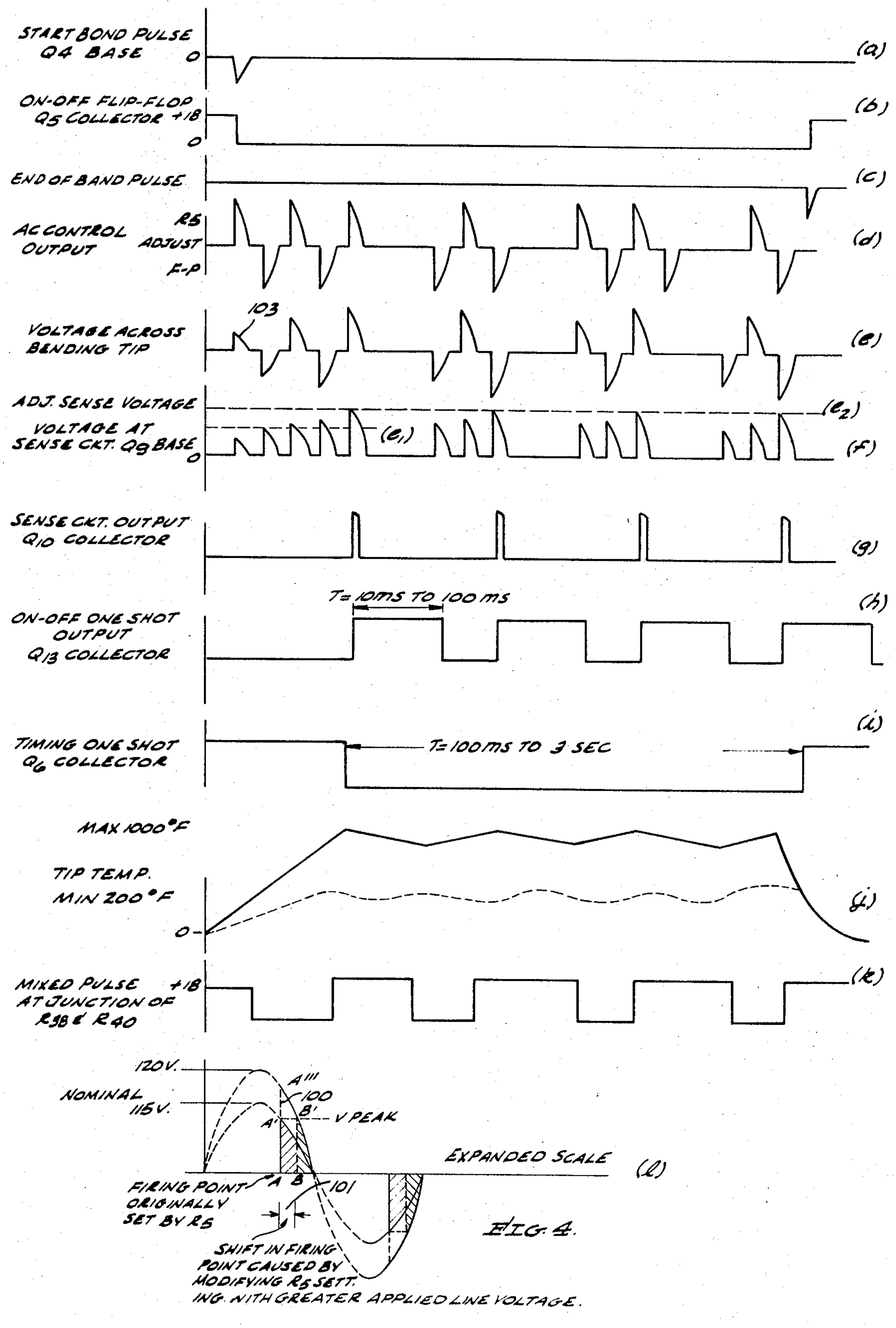

Refer again to FIG. 1 and in conjunction refer to the waveforms of FIG. 4(*a*) through FIG. 4(*l*) inclusive.

A fundamental feature of the invention is to apply the recognition that a capillary tip of suitable material for thermocompression bonding has the characteristic of a predictable rise in resistance with rise in temperature. This rise in resistance is sensed. By appropriate circuitry, which takes into cognizance the curve of rising change of resistance with rising of temperature, duration and limits of the temperature may be regulated. A suitable material for such capillary tips is conventional tungsten carbide available from said Hughes Aircraft Company, Welder Department, under Catalog No. EBB1–15, EBB–073, EBB15–15, EBB–2–15 and EBB–52, for example. Pure tungsten or tungsten alloys could also be utilized, for example an alloy of 80 percent tungsten and 20 percent carbide.

Refer also to FIG. 1. The AC control circuit 16 furnishes a constant peak-to-peak voltage by virtue of a silicon control rectifier circuit and a unijunction transistor circuit to be described and illustrated in FIG. 2. The constant peak-to-peak voltage from the AC control circuit 16 is applied to the primary of the heating transformer T1. By constant peak-to-peak voltage is meant that the voltage cannot vary in amplitude beyond a predetermined positive peak or beyond a predetermined negative peak. In order for the circuit to operate the AC control unit 16 must limit the positive excursion and the negative excursion to predetermined upper and lower limits respectively. That is, the SCR switching unit of the AC control 16 (to be described) provides the AC control output voltage shown on the waveform of FIG. 4(*d*). As will be described hereinafter, although this voltage is adjustable, once adjusted, the voltage is not permitted to stray beyond the peak-to-peak voltage levels described. This peak-to-peak amplitude must be maintained regardless of variations in the AC line input, due to components variations, etc.

The system requires sensing of the peak-to-peak voltage of the capillary tip 11. The capillary tip 11 peak-to-peak voltage also must be closely controlled. Accordingly, it is critical that the AC control circuit keep close tolerances of output peak-to-peak voltage.

Assume a rise in capillary tip 11 temperature. The capillary tip 11 is of material and configuration such that a rise in capillary tip 11 temperature causes a corresponding rise in the resistance across the capillary tip 11. This rise in resistance is reflected by a rise in voltage drop across the capillary tip 11 resistance as compared with the internal resistance of the heating transformer T1.

Figure 2:
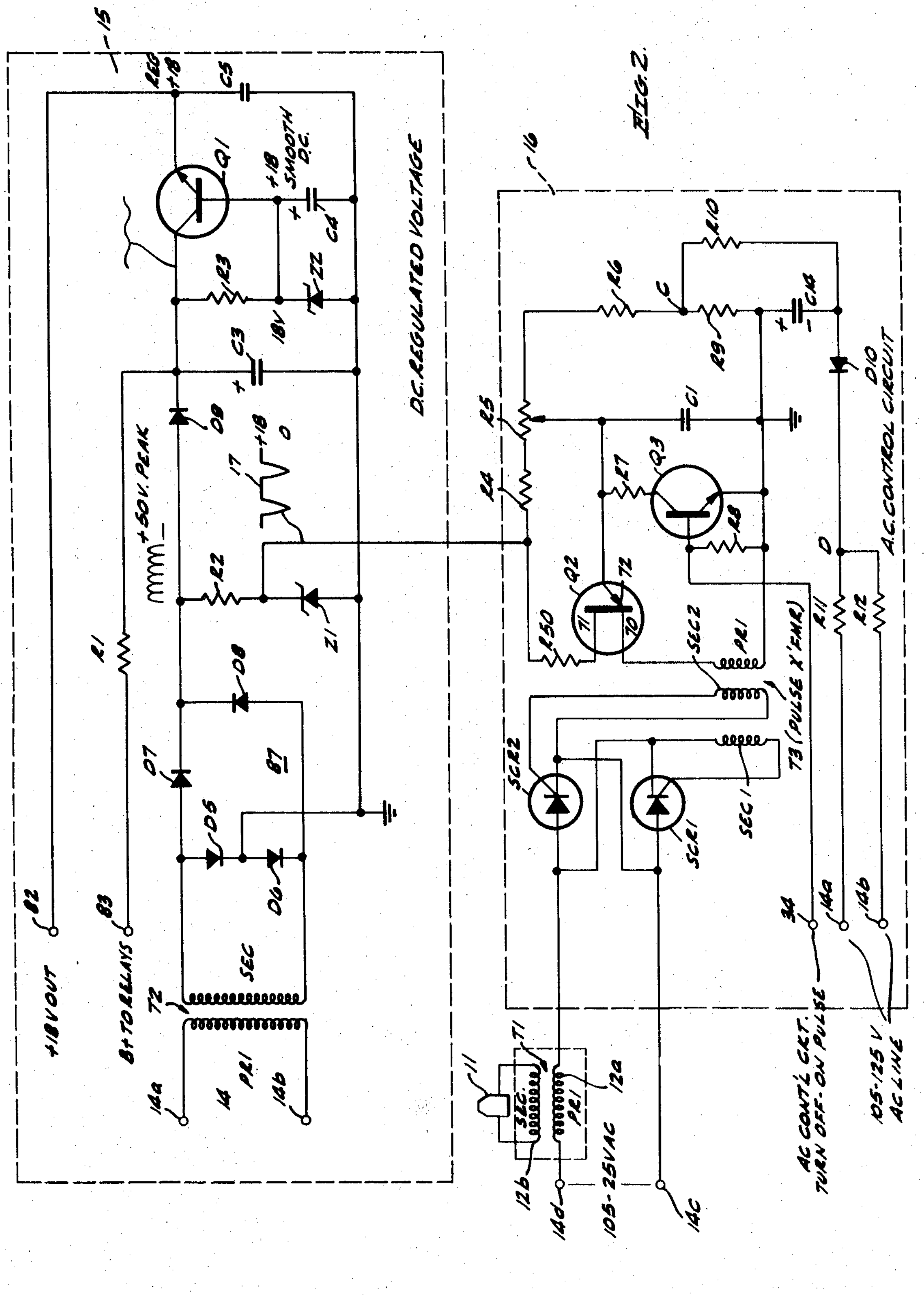
FIG. 2 is a schematic diagrammatic representation of AC input, DC regulated power supply, heating transformer, and AC control circuits comprising silicon-controlled rectifier (SCR) control circuits and a phase or conduction angle-shifting network, employable in the preferred embodiment of FIG. 1.
Figure 3:
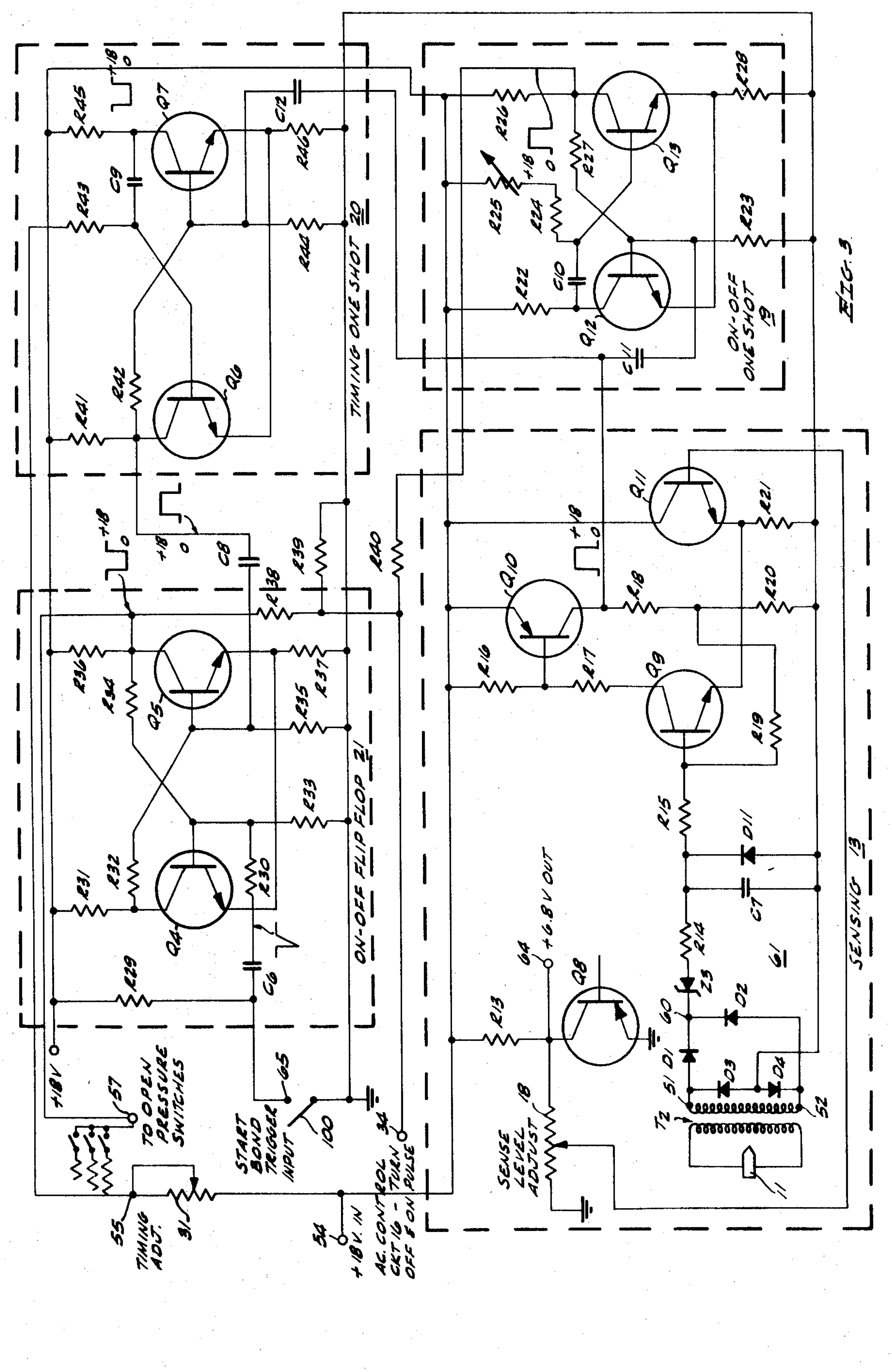
FIG. 3 is a schematic diagrammatic representation illustrating sensing and timing circuits employable in the embodiment of FIG. 1, the sensing circuits essentially comprising a Schmitt trigger circuit and an on-off one-shot multivibrator circuit and the timing circuits comprising a timing one-shot multivibrator circuit and an on-off flip-flop circuit, the figure further illustrating circuit elements to sum the output of the sensing and timing circuits to apply the composite output to the AC control circuit.

Refer further to FIG. 2 and to FIG. 3. The secondary (not numbered) of the heating transformer T1 has its ends (not numbered) respectively connected to the opposite sides (not numbered) of the capillary tip 11. The heating transformer T1 resistance may be considered as being connected from an end of its transformer T1 secondary winding to the side of the tip to which this secondary winding end is connected. Therefore, assuming constant peak current, the ratio of the voltage drop across the capillary tip 11 resistance and the heating transformer T1 resistance will change when a rise or increase in capillary tip 11 resistance occurs. The sense circuit 13 then senses a higher voltage across the increased capillary tip 11 resistance. An example of voltages across the capillary or bonding tip 11 is illustrated in FIG. 4(*e*). Note in this example the rise in the peak-to-peak level voltage in going from left to right in the first waveform illustrated. This indicates a rising voltage across the capillary tip 11 which is sensed by the sensing circuit 13. The sensing circuit 13 (to be described) comprises a step-up transformer, the secondary of which is connected to a full wave rectifier to present a full wave rectified pulsating DC output corresponding to the changes. Thus, the voltage across the capillary tip 11 is sensed, is amplified, and forms a pulsating DC such as represented in the waveform of FIG. 4(*f*). This waveform of FIG. 4(*f*), representing the amplified and rectified output voltage of the capillary tip 11 dependent upon its temperature, is applied to the input to a Schmitt trigger which is in the sensing circuit 13 to be described in detail.

Refer to FIG. 3. FIG. 3 schematically illustrates in detail the sensing circuit 13, and the timing circuits comprising the on-off one-shot multivibrator circuit 19, the timing one-shot multivibrator circuit 20, and the on-off flip-flop circuit 21.

THE SENSING CIRCUIT 13

Refer to the sense circuit 13. A sense transformer T2 is provided having secondary winding ends (not numbered). Sense transformer T2 is a conventional filament heating transformer but is connected reversely as a 6.3 volt:117 volt step-up transformer instead of a 117 volt:6.3 volt stepdown transformer. Terminals 51 and 52 are provided and terminate the ends of the transformer T2 secondary winding. A plurality of diodes D1, D2, D3, D4 and D11 and a zener diode Z3 are provided. The diodes D1, D2, D3 and D4 are connected in arrangement to form a full-wave rectifier circuit 61. The anodes of diodes D3 and D4 are connected together. The cathode of diode D3 is connected to the anode of diode D1 and to the sense transformer T2 secondary winding terminal 51. The cathode of diode D4 is connected to the anode of the diode D2 and to the transformer T2 secondary terminal 52. The cathodes of diodes D1 and D2 are connected together. The junction of the cathodes of diodes D1 and D2 is connected to the cathode of zener diode Z3. The junction between the anodes of diodes D3 and D4 is grounded. A pair of resistors R14 and R15 are provided and are connected in series. The cathode of diode D11 is connected to the junction of resistors R14 and R15, and its anode is grounded. A capacitor C7 is provided and connected in parallel with diode D11. Transistor stages comprising transistors Q8, Q9, Q10 and Q11 are provided. Each of transistors Q8, Q9 and Q10 comprises an emitter, a base and a collector. The full-wave rectifier circuit comprising diodes D1, D2, D3 and D4 has an output point 60. Point 60 is connected to the zener diode Z3, The anode of zener diode Z3, resistors R14 and R15 and the base of transistor Q9 are respectively connected in series. Resistor R14 and capacitor C7 together comprise a filter to filter out transient noise. Diode D11 is a clamping diode which eliminates stray unwanted negative going excursions. Transistor stages Q9 and Q11 form a Schmitt trigger arrangement which performs a comparison circuit function. Transistor Q10 is a switching transistor. The emitters of transistors Q9 and Q11 are connected together and are connected to ground through a resistor R21. A pair of resistors R19 and R20 are provided and are connected in series between the base of transistor Q9 and ground. A terminal 54 is provided and connected to the regulated 18 volts output from power supply unit 15 and to the emitter of transistor Q10 and the collector of transistor Q11. A pair of load resistors R17 and R16 are provided. Resistors R17 and R16 are respectively connected in series between the collector of transistor Q9 and the +18 volt supply input from terminal 54 which leads from the DC regulated supply unit 15. The junction of resistors R17 and R16 is connected to the base of transistor Q10. The opposite end of resistor R16 is connected to terminal 54. Connected between the junction of resistors R19 and R20 and the collector of transistor Q10 is a resistor R18. A resistor R13 is provided and connected between the collector of transistor Q8 and terminal 54. The emitter of transistor Q8 is grounded. Transistor Q8 is connected as a zener diode and provides the 6.8 volt output of the DC regulated supply unit 15. A terminal 64 is provided at the collector of transistor Q8 to provide the 6.8 volts elsewhere in the system.

SENSING CIRCUIT 13 OPERATION

Refer also to FIG. 4. From the sense transformer T2 secondary output, corresponding input signals are applied at terminals 51 and 52 to the respective cathodes of the pair of back-to-back connected diodes D3 and D4. These signals are transformed by the full wave circuit 61 to an output waveform such as illustrated at FIG. 4(*f*) and are applied through zener diode Z3 and through resistors R14 and R15 to the base of transistor Q9. Restating, the voltage waveform of FIG. 4(*e*), that is the voltage across the bonding or capillary tip 11, is applied to the sensing circuit 13 and appears at the point 60 shown at the cathode of the zener diode Z3 in FIG. 3. Since the signal of FIG. 4(*e*) is relatively large and the response to provide the required regulation need only be concerned with changes in the resistance of capillary tip 11, the zener diode Z3 enables only the upper portion of the waveform of FIG. 4(*e*) to pass and blocks the lower portion below the dashed line $e_1$. The noise filter circuit comprising the diode D11 and the resistor R14 brings or references the dashed line $e_1$ of FIG. 4(*e*) to ground level between the base of transistor Q9 and the short circuit to AC and DC ground provided by capacitor C7 and diode D11. Resistor R15 is an isolation resistor. Resistor R15 prevents AC feedback between the collector of transistor Q10 and the emitter of transistor Q9, through resistors R19 and R18, from being grounded across the diode D11 and the capacitor C7. When the signal applied to the base of transistor Q9 surpasses the voltage at the emitter of transistor Q9 plus the back bias of the transistor Q9 base to emitter diode, transistor Q9 goes into conduction lowering the voltage at the base of transistor Q10. This causes the bias of the base to emitter diode of Q10 to be exceeded and transistor Q10 goes into conduction. Conduction of transistor Q10 causes a positive going voltage to appear at the transistor Q10 collector as indicated by the FIG. 4(*g*) and the illustrated square wave positive-going pulse at the transistor Q10 collector. Upon heavy conduction, this positive voltage will approach the +18 voltage supply from terminal 54 to the transistor Q10 emitter. This positive voltage causes current flow through resistors R18 and R19 to provide positive-going feedback which is applied to the base of transistor Q9. Conduction of transistor Q9 then rapidly rises and transistor Q9 goes into saturation causing the voltage at the base of transistor Q10 to fall, thus terminating the pulse. This is illustrated in FIG. 4(*g*) by the square wave or pulse which represents the sense circuit 13 output at the transistor Q10 collector.

By the above-described action of sensing or sense circuit 13, when the predetermined set desired level of capillary tip 11 temperature has been reached, the waveform output of FIG. 4(*g*) appears at the collector of transistor Q10. This output triggers the on-off one-shot multivibrator circuit 19 and also simultaneously triggers the timing one-shot multivibrator 20. Triggering the on-off multivibrator 19 causes the AC control circuit 16 to turn off the heating transformer T1 a fixed predetermined time period (see FIGS. 1 and 4, FIG. 4(*h*) and FIG. 4(*j*)). The signal applied to the timing one-shot multivibrator 20 also causes the timing one-shot multivibrator 20 to set the timing so that the duration of heating from the heating transformer T1 which will be applied will be confined to the time necessary for the capillary tip 11 to continue to be heated and for heating to be discontinued at the end of that time.

THE ON-OFF ONE-SHOT MULTIVIBRATOR CIRCUIT 19

Refer to the circuit of the on-off one-shot multivibrator 19 in FIG. 3. A pair of transistors Q12 and Q13, each having a collector, an emitter and a base, are provided. Provided also are a collector load resistor R26, a transistor Q12 collector load resistor R22 and base resistor R23, a feedback resistor R27, a timing resistor R24, a variable timing resistor R25, a transistor Q12 and Q13 shared emitter resistor R28, and a coupling capacitor C10. The emitters of transistors Q12 and Q13 are connected together and are connected to ground through shared emitter resistor R28. Collector load resistor R22 is connected between the +18 volt supply from the terminal 54 from DC regulated supply 15 and the collector of transistor Q12. A coupling capacitor C11 is provided and couples the sense circuit 13 to the on-off one-shot multivibrator 19. Capacitor C11 is connected between the collector of transistor Q10 and the base of transistor Q12 to couple the output from transistor Q10 to transistor Q12 of multivibrator 19. Base resistor R23 is connected between the base of transistor Q12 and ground. In flip-flop multivibrator coupling arrangement, capacitor C10 is coupled between the collector of transistor Q12 and the base of transistor Q13 and a coupling resistor R27 is coupled between the base of transistor Q12 and the collector of transistor Q13. Collector load resistor R26 is connected between the collector of transistor Q13 and via terminal 54 to the +18 volt supply from DC regulated power supply unit 15. Adjustable resistor R25 and resistor R24 are the on-off one-shot multivibrator 19 timing resistors. Timing resistor R24 is connected at one end to the base of transistor Q13 and at the other end to adjustable resistor R25. Resistor R25 is connected in series with resistor R24. At the end opposite its resistor R24 connected end, resistor R25 is connected via terminal 54 to the 18 volt regulated DC voltage from supply source 15. A terminal 34 is provided. Output coupling resistor R40 (see FIG. 1 also) is connected at one end to the collector of transistor Q13. The other end of output coupling resistor R40 is connected to terminal 34. A resistor R39 is provided in the AC control circuit to be described in detail hereinafter. Resistor R39 is connected between the output end of resistor R38 of the on-off flip-flop circuit 21 (see FIG. 1 also) and ground. At the terminal 34 connected end resistor R40 is also connected to the junction of resistors R39 and R38 of the on-off flip-flop circuit 21. The output at the junction between resistors R40, R38 and R39 is connected to terminal 34 to apply an AC control turnoff and turn-on pulse input to AC control circuit 16.

OPERATION OF THE ONE-SHOT MULTIVIBRATOR CIRCUIT 19

The circuits of transistors Q12 and Q13 operate as a conventional one-shot multivibrator circuit. Upon application of a positive-going pulse input from transistor Q10, the input is coupled through capacitor C11 to the base of transistor Q12. This causes transistor Q12 to conduct. This conduction lowers the voltage at the transistor Q12 collector. This lowered collector voltage is coupled through capacitor C10 to the base of transistor Q-13 to turn off transistor Q13. Upon turning off transistor Q13 the voltage at its collector approaches the +18 volts from terminal 54 since there is no current and hence no voltage drop across resistor R26. This positive going voltage is coupled back through resistor R27 to the base of transistor Q12 which causes transistor Q12 to go into saturation very rapidly. The positive 18 volts at the collector of transistor Q13 is coupled through resistor R40 via terminal 54 to turn off the AC control circuit 16 (also see FIG. 1) very rapidly. The on-off one-shot multivibrator 19 comprising the circuits of transistors Q12 and Q13 remains conducting until capacitor C10 again becomes charged through the timing resistors R25 and R24. When the right side of capacitor C10 reaches a positive enough value by charging of the positive 18 volts from terminals 54 through resistors R25 and R24, the base of transistor Q13 becomes sufficiently positive such that the base to emitter drop enables conduction of transistor Q13. Conduction of transistor Q13 causes lowering of the voltage at its collector due to the voltage drop across resistor R26. The voltage drop across resistor R26 is coupled back through resistor R27 to the base of transistor Q12 causing transistor Q12 to become rapidly cutoff. The on-off one-shot multivibrator 19 stable state is in the cutoff condition of transistor Q12 and the conduction of transistor Q13. Therefore, only one positive pulse is applied to the AC control circuit 16 before the steady state of the on-off one-shot multivibrator 19 is resumed. The application of the positive pulse to the AC control circuit 16 is illustrated by the waveform of FIG. 4(*h*) and of FIG. 3 at the collector of transistor Q13. This pulse causes the AC control circuit 16 to turn off the heating transformer T1 for a predetermined fixed time period (see FIGS. 1 and 2) enabling the capillary tip 11 to cool below the predetermined reference set by sense level adjust potentiometer 18, FIG. 3.

THE TIMING ONE-SHOT MULTIVIBRATOR CIRCUIT 20

The circuit arrangement of the timing one-shot multivibrator 20 is similar to that of the on-off one-shot multivibrator 19. In multivibrator 20 is provided transistor stages comprising transistors Q6 and Q7, each transistor having a collector, a base, and an emitter. Provided also are a transistor Q6 collector load resistor R41, a transistor Q7 base resistor R44, and collector load resistor R45, transistor Q6 collector to transistor Q7 base coupling resistor R42, a transistor Q7 collector to transistor Q6 base coupling capacitor C9, a timing resistor R43, adjustable timing resistor 31 (see FIG. 1 also), and an emitter resistor R46 shared by both stages Q6 and Q7. The emitters of transistors Q6 and Q7 are electrically joined. One end of resistor R46 is connected to the junction of the emitters of transistors Q6 and Q7. The other end of resistor R46 is connected to ground. A coupling capacitor C12 is provided. Coupling capacitor C12 is connected between the collector of transistor Q10 of the sensing circuit 13 and the base of transistor Q7 and couples the output from the collector of transistor Q10 to the base of transistor Q7. Base resistor R44 is connected between the base of transistor Q7 and ground. The collector of transistor Q7 is coupled to the base of transistor I6 through coupling capacitor C9. The collector of transistor Q6 is coupled to the base of transistor Q7 through resistor R42. Collector load resistors R41 and R45 are connected between the +18 volt power supply source from the regulated power supply 15 and the respective collectors of transistors Q6 and Q7. A terminal 55 is provided. Timing adjustment or bonding duration switch 31 is a stepping switch having its resistance portion connected between the +18 volts supply from terminal 54 and its stepping arm or continuous slider arm (not numbered). The timing resistor R43 is connected between the base of transistor Q6 and terminal 55, that is the continuous rheostat or stepping switch arm, which may be provided. The operator sets the position of timing adjustment resistor 31 to provide the time duration of the heating cycle. This heating cycle time duration is illustrated in the waveform of FIG. 4(*i*). Timing switch 31 is set by the operator to provide a heating cycle of duration such that a satisfactory bond is made. The proper setting of resistor 31 is dependent upon which material of the variety of materials upon which the operation could be performed is involved and other varying parameters.

OPERATION OF THE TIMING ONE-SHOT MULTIVIBRATOR CIRCUIT 20

Inasmuch as the operation of the timing one-shot multivibrator circuit 20 is substantially identical to that of the on-off one-shot multivibrator 19, the description of operation of the timing one-shot multivibrator will not be set forth herein in detail. Briefly, the positive pulse output from transistor Q10 is generated by sense circuit 13 upon reaching the predetermined desired temperature at which heating of the capillary tip 11 is to occur. The pulse output at transistor Q10 is applied to the base of transistor Q7 and turns on and one-shot timing multivibrator transistor Q7. Transistor Q7 goes into conduction which causes the transistor Q7 collector voltage to go down because of the current across resistor R45. This negative-going voltage is coupled through capacitor C9 to the base of transistor Q6 to turn transistor Q6 off which raises the voltage at its collector. The raising of voltage at the transistor Q6 collector rapidly increases the current through transistor Q10 until transistor Q10 goes into saturation. The action continues for one cycle until capacitor C9 is charged through adjustable timing resistor 31 and timing resistor R43 which ends the heating cycle.

A coupling capacitor C8 is provided. The positive 18 volt pulse at the output of the timing one-shot multivibrator 20 is applied from the collector of transistor Q6 to the on-off flip-flop circuit 21.

THE ON-OFF FLIP-FLOP CIRCUIT 21

The on-off flip-flop circuit 21 is bistable. Each time that a bonding operation is to be performed, by the above-described thermocompression bonder, the pressing of the ball (e.g., a gold ball formed by flame cutoff) against the workpiece or when the capillary tip engages the workpiece causes microswitch 100 to operate. Operation of microswitch 100 grounds the input circuit and thus provides a start bond trigger input into input terminal 65. This input is coupled to the on-off flip-flop circuit 21.

Refer to the circuit of the on-off flip-flop 21. A pair of transistor stages comprising transistors Q4 and Q5 and attendant circuits are provided. Each transistor of transistors Q4 and Q5 has an emitter, a base, and a collector. The attendant circuits comprise a shared emitter resistor R37, a transistor Q4 collector resistor R31 and base resistor R33, a transistor Q5 collector resistor R36 and base resistor R35, transistor Q4 and Q5 respective collector to base feedback resistors R32 and R34, a trigger input coupling capacitor C6, an input coupling resistor R30 and a voltage bleeder resistor R29. Microswitch 100 is connected between ground and the junction of one end of resistor R29 and one plate of capacitor C6. The other end of resistor R29 is connected to the +18 volt voltage supply from DC regulated supply source 15. The plate of capacitor C6 opposite its microswitch 100 connected plate is connected to one end of coupling resistor R30. The other end of coupling resistor R30 is connected to the base of transistor Q4. Capacitor C6 and resistor R30 are thus connected in series between microswitch 100 and the base of transistor Q4. Collector load resistor R31 is connected between the collector of transistor Q4 and the +18 voltage supply from the DC regulated supply unit 15. Collector load resistor R36 is connected between the collector of transistor Q5 and the +18 volt supply from DC regulated supply unit 15. The emitters of transistors Q4 and Q5 are connected together and are coupled to ground through shared emitter resistor R37. The plates of coupling capacitor C8 are respectively connected to the collector of transistor Q6 of the timing one-shot multivibrator circuit 20 and to the base of transistor Q5. Coupling capacitor C8 thus couples the output from the collector of transistor Q6 to the input to the base of transistor Q5. Base resistor R35 is connected between the base of transistor Q5 and ground. Base resistor R33 is connected between the base of transistor Q4 and ground. When microswitch 100 is operated, the start bond trigger input at terminal 65 is coupled to the base of transistor Q4 through coupling capacitor C6 and coupling resistor R30. Resistor R30 lowers the input voltage pulse so as to avoid overdriving the transistor Q4. Resistor R29 charges the input side (that connected to terminal 65) of the coupling capacitor C6 positively. Resistor R29 is connected between the input terminal 65 junction with the input plate of capacitor C6 and the +18 volts regulated supply from DC regulated supply unit 15.

OPERATION OF THE ON-OFF FLIP-FLOP CIRCUIT 21

Upon the initiation of a bonding operation and the operation of the microswitch 100, the terminal 65 is grounded. In the quiescent state of the on-off flip-flop 21, transistor Q4 is conducting heavily with an approximately 18 volts drop across its load resistor R31 such that is collector is at zero or ground voltage, and transistor Q5 is cut off which causes the voltage at its collector to be at the +18 volts supply voltage. Upon grounding at the point 65, by operation of microswitch 100, a negative-going pulse as illustrated to the right of capacitor C6 causes discharge of the capacitor C6. The negative going pulse is applied across resistor R30 to the base of transistor Q4. This cuts off heavily conducting transistor Q4 which causes the voltage at the collector of transistor Q4 to go rapidly toward positive 18 volts. This positive going voltage is coupled across resistor R32 substantially instantaneously to the base of transistor Q5 which causes transistor Q5 to go into conduction because of the approximately 18 volts emitter to base diode voltage. The waveform at the collector of transistor Q5 as therein illustrated is also represented in the waveform of FIG. 4(*b*). That is, the collector of transistor Q5 goes negative and is held approximately at ground due to continued heavy conduction of the transistor Q5 at approximately saturation. The negative going pulse at the collector of transistor Q5 is applied through resistor R38 to terminal 34 and thence to the AC control circuit 16 as the turn off and on pulse. The ground voltage applied at terminal 34 by rapid grounding of the collector coupled through resistor R38 causes the AC control circuit 16 to control the heating transformer 12 which commences to apply power to the capillary tip 11. Upon applying power to the capillary tip 11, the capillary tip 11 heats up and eventually its resistance approaches the point such that a positive-going voltage appears at the base of transistor Q9 of the sensing circuit 13. This in turn causes recycling wherein the on-off one-shot multivibrator 19 is triggered which results in the applying of a voltage to the AC control circuit 16 such that the heating transformer T1 is again turned off momentarily. When the on-off one-shot multivibrator 19 turns off the heating current to the capillary tip 11 applied by heating transformer T1 the duration of this is a very short cutoff period. As indicated in the waveform of FIG. 4(*g*) this short cutoff period has a pulse duration of from 10 to 100 milliseconds in accordance with the predetermined setting of the resistor R25. The adjustment of resistor R25 is critical because if it is too short the cooling off will never reach the predetermined temperature level before the circuit again causes a rise in temperature so that there will result an undesirable steady stepping upward in temperature until damage results and in any case constant heating of the work does not occur. If the resistance of R25 is set such that too long a cooling time occurs, the cycle from hot to cool and from cool to hot is too long in duration and the temperature differences between cool and hot state are too great for satisfactory bonding. The ideal case is to set resistor R25 and hence the duration of the on-off one-shot multivibrator 19 pulse such that rapidly recycling action on and off heating of the capillary tip 11 will occur around the predetermined level of desired heating such as to maintain a substantially constant temperature for the duration of the bonding cycle, which thereby enables good effective bonding to take place.

Refer again to FIG. 4. At the start of a bonding operation, by closing of the Start Bond Trigger Input microswitch 100, as shown by the waveform of FIG. 4(*a*), a start bond negative-going pulse is supplied to the on-off flip-flop 21. The start bond pulse is coupled through capacitor C6 and resistor R30 to the base of transistor Q4. The on-off flip-flop 21 then goes to the zero state. In this zero state, the transistor Q5 collector is at zero or ground voltage. This zero or ground voltage is coupled through resistor R38 and terminal 34 to the AC control circuit 16. AC control circuit 16 responsively causes the heating transformer T1 to furnish power to the capillary tip 11.

Refer to the waveform of FIG. 4(*d*) and FIG. 4(*e*). Initially as power is applied to the heating transformer T1 and then to the capillary tip 11, the voltage across the bonding or capillary tip 11 is low (see FIG. 4(*e*) first positive going pip). However, this voltage rises rapidly as illustrated by the sequentially increasing voltages of the first three positive going pips of the waveform of FIG. 4(*e*). In the Schmitt trigger level sense circuit 13, responsive to the rise in the temperature of the capillary tip 11, the waveform of FIG. 4(*f*) is developed at the transistor Q9 base. The lower portion of the waveform of FIG. 4(*f*) as illustrated by the dashed line ($e_1$) is discarded. When the pulses rise to the predetermined adjusted sense level at which the capillary tip 11 is to be maintained, the transistor Q9 conducts and a pulse or positive pip is produced at the sense circuit 13 output as illustrated at the transistor Q10 collector and in the waveform of FIG. 4(*g*). The adjusted sense level at which the tip 11 is maintained is adjusted by adjusting the adjustable sense level or temperature level potentiometer arm 18 (see FIG. 1 or FIG. 3). The Schmitt trigger sense level or transistor Q10 collector voltage is adjusted by the voltage applied to the base of transistor Q11. The transistor Q11 input base voltage is derived from potentiometer 18 and the regulated supply from zener diode connected transistor Q8 and resistor R13. Thus, by adjusting the potentiometer 18 and hence the voltage to which the collector of transistor Q10 is permitted to rise, the operator in effect varies the temperature setting of the tip 11. The raising of the temperature of capillary tip 11 above the level predetermined by setting of the potentiometer 18 causes a corresponding circuit output at the transistor Q10 collector. As illustrated also in the waveform of FIG. 4(*f*)this transistor Q10 collector output both (1) through coupling capacitor C11 actuates the on-off one-shot multivibrator 19 output from the transistor Q13 collector and (2) through capacitor C12 causes the timing waveform available at the one-shot multivibrator transistors Q6 and Q7 collectors to commence. The complementary waveforms at the collectors of transistors Q6 and Q7 initiate the time interval during which the heating operation during bonding is permitted to continue. The duration of time for which the transistor Q6 remains cutoff is illustrated in FIG. 4(*i*). A curve of tip temperature corresponding to this operation is illustrated in the waveform of FIG. 4(*j*).

Refer again to the on-off flip-flop 21 illustrated in FIGS. 1 and 3. At the end of the bond cycle, the trailing edge (rapid rise of voltage to +18 volts) of the wave pulse at the collector of transistor Q6 applies a pulse through capacitor C8 to the base of transistor Q5. This pulse fed through capacitor C8 reverses the state of the normally conducting on-off flip-flop 21 to cut it off. At that time the trailing edge of the waveform at the collector of transistor Q5 (see FIG. 3 transistor Q5 collector voltage) causes an end of bond pulse to be transmitted to terminal 57. From terminal 57 the end of bond pulse is applied to a conventional switching unit (not shown) which in turn shuts off a motor (not shown), resets the unit and causes recycling of a mechanical motor drive (not shown) and resets the equipment for the next bonding operation cycle. The next bonding operation cycle is restarted by the operator pressing the applicable switch button which causes the capillary tip 11 to again bear down upon the work. The mechanisms (not shown) are contained, for example, in the Hughes pulsed thermocompression bonder Model HPB–360, Catalog TC–1, obtainable from the Hughes Aircraft Company Welder Department, 2020 Oceanside Boulevard, Oceanside, California 92054.

THE DC REGULATED POWER SUPPLY UNIT 15

Refer to the upper portion of FIG. 2 and to FIG. 1. FIG. 2 illustrates schematic details of the DC regulated supply 15. A DC regulated supply 15 input transformer T4 is provided and has a primary and a 30 volt secondary winding. Power input from AC line source 14 is applied to the power transformer T4 primary winding. Across the secondary winding of the power input transformer T4 is provided a full-wave rectifier 87. Rectifier 87 comprises diodes D5, D6, D7 and D8. A resistor R2 is provided. The anodes of diodes D5 and D7 are connected together and to one side of the secondary of transformer T4. The cathode of diode D6 is connected to the anode of diode D8 and to the other side of the secondary of the transformer T4. The anode of diode D6 is connected to the cathode of diode D5 and the junction is connected to ground. The cathode of diode D7 is connected to the cathode of diode D8. The junction therebetween is connected to the side of resistor R2 opposite the extremity connected to the cathode of zener diode Z1. Thus, positive-going full-wave rectified pulses from bridge rectifier 87 are applied across zener diode 21 thereby providing an 18 volts pulse output 17 (see FIG. 1 also) at the junction of the cathode of zener diode Z1 and resistor R2. A voltage regulating stage comprising a regulating transistor Q1 having a base, a collector and an emitter and attendant circuitry is provided. Regulating is achieved by having the base transistor Q1 held at a relatively constant positive (+) 18 volt level. The emitter of transistor Q1 follows its relatively constant at 18 volts, held base to apply a +18 volt regulated power supply output at terminal 82. An isolating diode D9, a filter capacitor C3, a transistor Q1 collector load resistor R3, a second zener diode Z2, and filter capacitor C4 and C5 are provided. Resistor R3 is connected between the collector of transistor Q1 and the cathode of second zener diode Z2. The anode of diode Z2 is grounded. A zener diode is connected reversely and when the reverse voltage overcomes the back voltage breakdown point, the voltage across the zener diode is held constant. In parallel across the zener diode is connected filter capacitor C4. The junction between the cathode of zener diode Z2 and capacitor C4 is connected to the base of the regulating transistor Q1. Connection between the emitter of transistor Q1 and ground is filter capacitor C5. The cathode of isolating diode D9 is connected to the junction of the collector of transistor Q1 and resistor R3. The anode of diode D9 is connected to the junction between resistor R2 and the electrically joined cathodes of diodes D7 and D8. A terminal 83 and resistor R1 is provided. Resistor R1 is connected between the collector of transistor Q1 and terminal 83. Unregulated B+ voltage required for operation of relays in the equipment is applied from the collector of transistor Q1 through a resistor R1 to the terminal 83.

OPERATION OF DC REGULATED POWER SUPPLY 15

Power at approximately 115 volts is applied from AC source 14 to the primary of power transformer T4 and transmitted to the transformer T4 secondary. Rectifying circuit 87 connected to the ends of the secondary of transformer T4 and comprising the diodes D5, D6, D7 and D8 provides a full-wave rectified output at the junction between the cathodes D7 and D8 having approximately 50 volt peaks. The 50 volt peaks are attenuated across resistor R2 and are clipped by zener diode Z1 such that the waveform 17 constitutes a series of positive pedestals limited to +18 volts. This waveform 17 is applied to the input to AC control circuit 16 to activate AC control circuit 16 as will be described in the next section. On being applied through diode D9 the 50 volt peaks from rectifying circuit 87 are smoothed out by the filter circuit comprising capacitor C3. The smooth output level illustrated at the collector of transistor Q1 is at a level close to the 50 volt peak level of the input-rippling voltage from the rectifier 87. This voltage is applied through resistor R3 and by regulating action of zener diode Z2 a constant 18 volt level output voltage is attained at the junction between resistor R3, the cathode of zener diode Z2 and the junction between the base of the transistor Q1 and the underground plate of the capacitor C4. The emitter of transistor Q1 follows its base to provide the regulated positive 18 volt output at terminal 82 which is utilized for the circuits 13, 19, 20 and 21 illustrated in FIG. 3.

THE AC CONTROL CIRCUIT 16 AND HEATING TRANSFORMER T1

Refer further to FIG. 2 in conjunction with FIGS. 1 and 3. In the quiescent state of the AC control circuit 16: (1) no output is applied to the heating transformer T1; (2) no current is flowing across the primary of the heating transformer T1; and (3) the capillary tip 11 is not being heated. The input from the junction of resistor R38 and R39 is applied through terminal 34 to the AC control circuit 16 as turnoff and turn-on pulses (see FIGS. 2 and 3).

Refer to FIG. 2. Unijunction transistor or double-base diode Q2 and transistor Q3 are provided. Transistor Q3 has a collector, a base and an emitter. The emitter is grounded. A transistor Q3 collector load resistor R7 and a base resistor R8 are provided. Resistor R8 is connected between the base of transistor Q3 and ground. Unijunction transistor or double-base diode Q2 has a first base 70, a second base 71 and an emitter 72. Load resistor R7 is connected between the emitter 72 and the transistor Q3 collector. To the base of transistor Q3 is applied the AC circuit turn off-on pulse through input terminal 34. Terminal 34 is also shown in FIG. 3 as an output terminal. A pulse transformer T3 having a primary winding (not numbered), a secondary winding SEC 1 and a secondary winding SEC 2 is provided. A pair of silicon-controlled rectifiers SCR1 and SCR2 are provided. Silicon-controlled rectifier SCR1 and SCR2 each have a cathode, an anode and a gate. Between the base 70 of the unijunction transistor Q2 and ground is connected the primary of pulse transformer T3 to provide trigger pulses to the pair of silicon-controlled rectifiers SCR1 and SCR2. A current-limiting resistor R50 is provided. A zener diode Z1 and a bleeder resistor R2 are provided in the DC regulated power supply 15. This provides the 18 volt positive-going pulses from the DC regulated power supply 15 which is shown in FIG. 1 as one of the outputs from the DC regulated supply 15. Current-limiting resistor R50 is connected between the base 71 of unijunction transistor Q2 and the junction between the cathode of zener diode Z1 and bleeder resistor R2. A plurality of bleeder resistors R4, R6 and R9 and a potentiometer R5 are provided. Potentiometer R5 is adjusted for firing or conduction angle of both silicon controlled rectifiers SCR1 and SCR2 and hence of average and RMS (root mean square) output voltage and current as well as peaks permitted from the silicon-controlled rectifiers SCR1 and SCR2. Resistor R4 is connected at one end to the junction between the cathode of zener or breakdown diode Z1 and the end of resistor R50 opposite its transistor Q2 base 71 connected end. Connected in series with the other end of resistor R4 are respectively the resistance portion of potentiometer R5, resistor R6, resistor R9 and ground. Positive 18 volt regulated supply 15 output pulses 17 are provided (see also FIG. 1) and are applied at the junction of resistors R50 and R4. The slider arm (not numbered) of the potentiometer R5 is connected to the emitter of the unijunction transistor Q2. A capacitor C1 is connected between ground and the junction of the emitter 72 and the slider arm of potentiometer R5. AC line input means 14 comprising a terminal 14*a* and a terminal 14*b* (see FIG. 1 also) are provided and apply AC input power, at 105 to 125 volts. Between the junction C of resistors R6 and R9 and a point D are provided a filter resistor R10 and a diode D10. One end of filter resistor R10 is connected to junction point C. The other end of resistor R10 is connected to the anode of diode D10. A filter capacitor C14 is provided. Power input resistors R11 and R12 are provided. Resistor R11 is connected between input terminals 14*a* and point D. Resistor R12 is connected between input terminal 14*b* and point D. Inputs from the inputs 14*a* and 14*b* from the AC line 105 to 125 volts are applied at about 50 to 60 cycles through the resistors R11 and R12 and applied to the cathode of diode D10. Diode D10 rectifies the input power. Capacitor C14 and resistor R10 comprise a filter circuit to filter the input ripple from diode D10 and apply a negative voltage at the junction C between bleeder resistors R6 and R9. Filter capacitor C14 is connected between the anode of diode D10 and ground. The anode of silicon-controlled rectifier SCR1 is connected to the cathode of silicon rectifier SCR2. The anode of silicon-controlled rectifier SCR2 is connected to the cathode of silicon-controlled rectifier SCR1. The secondary sec 1 of the pulse transformer T3 has one end connected to the gate of silicon-controlled rectifier SCR1. The other side of the secondary sec 1 of pulse transformer T3 is connected to the junction of the cathode of the silicon-controlled rectifier SCR1 and the anode of the silicon-controlled rectifier SCR2. The other secondary sec 2 of the pulse transformer T3 is connected between the junction of the rectifier SCR1 anode and the rectifier SCR2 cathode and the gate of silicon-controlled rectifier SCR2. Secondary sec 2 of pulse transformer T3 thus applies current between the cathode and gate of silicon-controlled rectifier SCR2. Input AC power terminals 14*c* and 14*d* are provided across which about 117 volts AC input is applied. Input to the junction of the anode of rectifier SCR1 and the cathode of rectifier SCR2 is provided from the terminal input 14*c*. Heating transformer T1 has a primary winding 12*a* and a secondary winding 12*b*. The primary winding 12*a* is connected between the anode of silicon-controlled rectifier SCR2 and terminal 14*d*. The anode of the silicon-controlled rectifier SCR2 which is connected to the primary 12*a* of the heating transformer T1 controls the output voltage thereacross. The secondary 12*b* of heating transformer T1 is disposed across the bonding of capillary tip 11 to apply heat thereto.

Operation of the AC Control Circuit 16 and Heating Transformer T1 to Bring the Required Temperatures to Maintain Substantially Constant Temperature of Capillary Tip 11 During the Pulse Period and to Cut Off the Temperature of Capillary Tip 11 at the End of the Bond Pulse Refer again to the AC control circuit 16 shown in the lower half of FIG. 2. Where the on-off flip-flop 21 is in on condition, its output is modified by the action of the on-off one-shot multivibrator 19 which periodically goes on and off during the period that the on-off flip-flop 21 is on. The on-off flip-flop 21 regulates the duration of time after closing start bond switch 100 that the capillary tip 11 may be activated to on or being heated condition (in the absence of sensing by sense circuit 13 of temperature above predetermined temperature and the consequent time interval of delay in heating effected by on-off one-shot multivibrator 19). The on-off one-shot multivibrator 19 continuously causes the AC control circuit responsively to go off and on for each deviation above and below and then back within predetermined heating cycle temperature upper and lower range limits while the temperature of the capillary tip 11 deviates from the predetermined temperature at which the capillary tip 11 is to be operated. The output of the on-off flip-flop 21 is applied through resistor R38 into the AC control circuit 16. Specifically, this output is applied through terminal 34 (see FIGS. 2 and 3) as input to the base of transistor Q3. Applying this input voltage from the on-off flip-flop 21 effectively grounds the base of transistor Q3. This causes the base to emitter diode of transistor Q3 to be essentially in unbiased condition which turns transistor Q3 off. With the transistor Q3 in off condition, there is no current conduction. This permits capacitor C1 to become charged by the positive-going voltage peaks of waveform 17 which are applied from between the junction of zener diode Z1 and resistor R2 through the resistor R4 and the portion of the resistance of the adjust for conduction potentiometer R5 to the slider arm positioned point. The ungrounded plate of capacitor C1 is connected to the slider arm of potentiometer R5. When the voltage across capacitor C1 rises to the firing point of the unijunction transistor Q2, the unijunction transistor Q2 switches because a short circuit effectively occurs between the base 70 and the emitter 72. A unijunction transistor Q2 switching pulse results and is applied to the primary of pulse transformer T1. The applied pulse is transmitted to the secondary sec 1 and the secondary sec 2 of pulse transformer T3. The pulse transmitted to secondaries sec 1 and sec 2 trigger silicon-controlled rectifiers SCR1 and SCR2 into current conduction. This conduction provides current conduction through the primary 12*a* of heating transformer T1 to terminal 14*d*. The current rise (or flux change) through the primary 12*a* of heating transformer T1 is transformed to its secondary 12*b* and secondary 12*b* applies current through the resistance of and therefore heat to the capillary tip 11. The silicon-controlled rectifier SCR1 and SCR2 circuit is similar to that described in "Notes on the Application of the Silicon Controlled Rectifier, 0EGG–371–1, AC Phase Control Switch," pages 41–43, and FIG. 9.3, Circuit Designers' Guide, Application Engineering, Semiconductor Products Department, General Electric Company, Dec. 1958. However, in the present circuit there has been incorporated a turn-on/turn-off transistor Q3 and a regulating circuit which maintains a constant peak-to-peak output from the silicon-controlled rectifiers with a 10 percent peak-to-peak line voltage change. The circuit operates in response to pulses to provide power for a small duration of the actual time of the input AC sine wave. The portion of time is regulated by the potentiometer R5 and this also regulates the peak-to-peak voltage which is permitted to be applied to the primary of heating transformer T1. FIG. 4(*l*) which is drawn to enlarged scale illustrates this operation. The conduction angle illustrated in FIG. 4(*l*) corresponds to the first pip 103 of the waveform of FIG. 4(*e*).

Both of the signals, the steady state signal from the on-off flip-flop 21 (transistor stages Q4 and Q5), and the periodic pulse from the on-off one-shot multivibrator 19 (transistor stages Q12 and Q13) must together be presented at terminal 34 in order to bring the base voltage of transistor Q3 essentially to ground. With one or the other of these voltages applied, transistor Q3 will be in conduction and turn-on of the primary of pulse transformer T3 is not effected. Therefore the combined mixed signal must be applied to terminal 34. Also the 18 volts pulses 17 from the junction of resistor R2 and the cathode of zener diode Z1 of the DC regulated supply 15 must be applied through resistor R4 and the in series resistance portion of potentiometer R5 to its slider arm to permit charging of capacitor C1 such that a short occurs between base 70 and emitter 72 of the unijunction transistor Q2, to enable heating to occur.

The on-off flip-flop 21 is in "on" or "low" voltage condition during the period between the start bond pulse and the end of bond pulse. The on-off flip-flop 21 is "on" or "low" condition determines the duration during which heating is permitted providing the on-off one-shot multivibrator 19 is simultaneously in "on" or "low" condition. With the on-off one-shot multivibrator 19 in "off" or "high" voltage condition the combined waveform applied through terminal 34 to the base of transistor Q3 permits transistor Q3 to conduct. With conduction of transistor Q3 occurring, capacitor C1 cannot be charged by the pulses 17 applied from power supply unit 15. Therefore, not output pulse occurs across the primary of the pulse transformer T3, and a voltage is not induced in transformer T3 secondaries sec 1 and 2. Hence, no change of current or flux occurs across the primary 12*a* of transformer T1 and there is no induced current across the transformer T1 secondary 12*b*. Capillary tip 11 is therefore not heated. Also, when the on-off flip-flop 21 is off or in "high" (above ground voltage) condition, the on-off one-shot multivibrator 19 pulse (low condition) does not alone stop conduction of transistor Q3. Therefore, both the on-off flip-flop 21 and the on-off one-shot multivibrator 19 must be in operation, that is both in low (near or at ground) condition, to cause heating of the capillary tip 11 by the heating transformer T1.

A feature of the circuit is that when the capillary tip 11 is heated to desired predetermined temperature as determined by sense level adjustment 18, see FIG. 3 and 4(*j*), the sensing circuit 13 senses the corresponding rise in voltage and triggers the on-off one-shot multivibrator 19. This provides a turnoff pulse at AC control circuit terminal 34 such that transistor Q3 conducts for the predetermined time determined by resistors R25 and R24 and prevents the charging of capacitor C1. With both the on-off flip-flop 21 on and the on-off multivibrator 19 off (both in low state) the capacitor C1 can be charged over the portion of the cycles permitted by the circuit of potentiometer R5 to permit conduction of the silicon-controlled rectifiers SCR1 and SCR2 and hence of the heating transformer T1 primary. By activation of sense circuit 13 and on-off one-shot multivibrator 19, charging of capacitor C1 and hence activation of unijunction transistor Q2 is arrested for the predetermined time period determined by timing resistors R24 and R25. Thus each time the temperature rises to predetermined peak desired temperature, the sensing circuit 13 deactivates the AC control circuit 16 to deactivate the heating transformer or element T1 for a predetermined duration during which heating is prevented, see FIG. 4(*j*) and FIG. 4(*h*). The period is set by timing resistors R24 and R25 such that it is short enough to provide the substantially approximate flat heating curve illustrated, for example, in FIG. 4(*j*).

The circuit comprising resistors R11 and R12, diode D10, resistor R10 and capacitor C14 provide a negative DC voltage which is proportional to the 105–125 line voltage amplitude. Diode D10 is a half-wave rectifier which allows only the negative swings or half cycles to go through. Capacitor C14 smooths out the ripple of the negative half-cycle output of diode D10. Refer again to FIG. 4(*l*) in conjunction with FIG. 2. When the line voltage across the AC input lines 14*a* and 14*b* (line 14 of FIG. 1) rises above the nominal 115 volt AC input voltage, since it is a negative supply in essence, the anode of diode D10 will go in the negative direction with respect to the direction it would normally go an input of 115 volts. For example, when the 115 volt input goes to 120 volts, a more negative voltage is applied through resistor R10 to the junction C between resistors R9 and R10. This negative voltage is coupled through resistor R6 and the resistance portion shown in FIG. 2 to the right of the slider arm of potentiometer R5 to provide a more negative voltage at the slider arm of potentiometer R5 and hence at the control electrode 72 of unijunction transistor Q2. It should be recalled that potentiometer R5 is initially set by the operator of the bonding machine, (1) to provide a correct duration of the input sine wave power from terminal 14*a* and 14*b* which is to be utilized, and (2) to provide the correct peak-to-peak voltage which is permitted to be applied to the capillary tip 11.

Assume potentiometer R5 has been set initially for desired heat transformer T1 output. The correct set position is illustrated by the solid line A—A′ of FIG. 4(*l*) which is the firing point originally set by rectifier R5. The action is illustrated on the positive swing and as illustrated, the same following described action occurs on the negative swing. Assume that the input voltage rises to 120 volts, for example, as shown by the dashed continuation line 100 upwards in the waveform of FIG. 4(*l*). The therefore greater negative swing of the terminal 14*a* and 14*b* input sine wave is rectified in diode D10 and applied as a more negative voltage at the junction C between resistors R9 and R6. This negative-going voltage is transmitted through resistor R6 and the adjacent resistance portion of potentiometer R5 to provide a more negative voltage at the slider arm of potentiometer R5. This causes C1 to charge at a slower rate thus delaying the point at which the silicon-controlled rectifiers SCR1 and SCR2 fire. This modification (upon change of input supply voltage) of the setting of potentiometer R5 is illustrated in the dashed line B—B′ of FIG. 4(*l*). By the action of the input-regulating circuit comprising resistors R9, R10, R11, R12 and diode D10 the conduction angle is changed and the point of firing is varied as illustrated in the dashed line B—B′ of the waveform of FIG. 4(*l*) at the point B′ (V-peak) where the extended dashed line B—B′ shows the effect of an increase from 115 volt to a 120 volt sine wave, for example. The invention insures that this action is otherwise compensated for as such variation would adversely affect the capillary tip 11 heating action. Because of the inventive circuit the conduction angle is modified as illustrated in FIG. 4(*l*) by the line B—B′ such that the beginning of conduction is delayed and begins later at point B′. Thus the conduction angle is changed to give the desired peak-to-peak voltage which should be permitted on the capillary tip 11. That is, effectively instead of actually physically moving the slider arm of potentiometer R5 to the right to reduce the voltage down from the 17 volt input level through resistor R4, the negative-going voltage applied at the slider arm point (from point C through resistor R6 and the resistance portion to the right of the slider arm of potentiometer R5 as illustrated in FIG. 2), shifts the conduction or firing point with an increase in AC voltage input at terminals 14*a* and 14*b* of source 14. This shift or modification of the conduction angle is illustrated by the double arrowed line 101 of FIG. 4(*l*) which line is the angular distance between points A and B or the shift in firing point caused by effectively modifying the potentiometer R5 setting with a greater applied (minus) at the extremity thereof connected to R6. It should be noted that this increase supply is applied both to the primary 12*a* of the heating transformer T1 and to the silicon-controlled rectifier SCR1 and SCR2 input and at the input terminals 14*a* and 14*b*. Thus the action of the circuits of the diode D10 and the resistor R10 enables proper circuit functioning and capillary tip 11 heating despite any changes of line voltage which affect the silicon controlled rectifier regulating tubes SCR1 and SCR2 and the primary 12*a* of the heating transformer T1. Capacitor C14 smooths out the ripple of the input negative half-wave rectified diode D10 output to present essentially DC changes at the point C. When the input sine wave from the AC line input goes to zero the silicon-controlled rectifiers SCR1 and SCR2 are automatically turned off and no heating by transformer T1 occurs. The silicon-controlled rectifiers SCR1 and SCR2 are provided so that the powerline input of both the positive and negative going portions of the input sine wave can be utilized. In the off condition, that is, with the on-off flip-flop 21 and the on-off one-shot multivibrator 19 not both simultaneously on to provide two simultaneous "lows" at point 34 together with the positive 18 volt pulsed input 17, transistor Q3 conducts continuously. When transistor Q3 conducts continuously, the voltage across capacitor C1 is shorted to ground through the low-value resistor R7 and the transistor Q3. In this condition, the control electrode of gate 72 of transistor Q2 is essentially connected to the transistor Q2 base 71 and the circuit from base 70 through the primary of pulse transformer T3 is open.

While in nowise to be construed as in any way limiting the invention, in one example of a practical circuit of the illustrative embodiment hereinabove described the components may have the following values and designations:

SEMICONDUCTORS AND NONLINEAR DEVICES

| Number on Drawings & in Specifications | Designation |
|---|---|
| TRANSISTORS | |
| Q1 | 2N1701 |
| Q2 | 2N1671 |
| Q3 | 2N3569 |
| Q4 | 2N2712 |
| Q5 | 2N2712 |
| Q6 | 2N2712 |
| Q7 | 2N2712 |
| Q8 | 2N3638 |
| Q9 | 2N2712 |
| Q10 | 2N2712 |
| Q11 | 2N2712 |
| Q12 | 2N2712 |
| Q13 | 2N2712 |
| DIODES | |
| D1-D11 inclusive | 1N4005 |
| Z1, Z2 and Z3 | 18-volt zener |
| SILICON-CONTROLLED RECTIFIERS | |
| SCR1 and SCR2 | 2N3898 |
| TRANSFORMERS | |
| T1 | Stepdown power transformer 110 to 40 volts, RMS, handling 100 amps peak current |
| T2 | Reversely connected (6.3 volt: 117 volt) filiment transformer |
| T3 | 1:1:1 pulse transformer |
| T4 | Stepdown 110:40-volt transformer |

| POTENTIOMETER | RESISTANCE |
|---|---|
| R5 | 10K |

| Number on Drawings & in Specification | Ohms and Tolerance Where Special |
|---|---|
| RESISTORS | (K=1,000) |
| R1 | 560 Ω, 1w. |
| R2 | 4.7 Ω2W. |
| R3 | 3K |
| R4 | 22K, 1% |
| R6 | 27K, 1% |
| R7 | 1K |
| R8 | 2K |
| R9 | 10K, 1% |
| R10 | 175K, 1% |
| R11 | 10K |
| R12 | 10K |
| R13 | 1K |
| R14 | 1.5K |
| R15 | 10K |
| R16 | 10K |
| R17 | 10K |
| R18 | 1.5K |
| R19 | 75K |
| R20 | 100 Ω |
| R21 | 1K |
| R22 | 1.5K |
| R23 | 4.7K |
| R24 | 2K |
| R25 | 50K (variable) |
| R26 | 1.5K |
| R27 | 4.7K |
| R28 | 27 Ω |
| R29 | 470K |
| R30 | 2K |

| POTENTIOMETER—Continued | RESISTANCE—Continued |
|---|---|
| R5 | 10K |

| Number on Drawings & in Specification | Ohms and Tolerance Where Special |
|---|---|
| R31 | 2K |
| R32 | 12K |
| R33 | 10K |
| R34 | 12K |
| R35 | 6.8K |
| R36 | 2K |
| R37 | 330 Ω |
| R38 | 10K |
| R39 | 1K |
| R40 | 10K |
| R41 | 1.5K |
| R42 | 4.7K |
| R43 | 6.2K |
| R44 | 1.2K |
| R45 | 1.5K |
| R46 | 27 Ω |
| R50 | 330 Ω |

| Number on Drawings & in Specification | Designation |
|---|---|
| CAPACITORS | (Microfarads = mfd.) |
| C1 | 0.1 |
| C3 | 50 mfd., 50 v., electrolytic |
| C4 | 35 mfd., 25 v., electrolytic |
| C5 | 100 mfd., 25 v., electrolytic |
| C6 | 0.01 |
| C7 | 0.05 |
| C8 | 0.001 |
| C9 | 35 mfd., 25 v., electrolytic |
| C10 | 5 mfd., 25 v., electrolytic |
| C11 | 680 picofarads |
| C12 | 500 picofarads |
| C14 | 1 mfd., 100 v., electrolytic |

One modification of the illustrative embodiment, for example, might involve the provision of circuits to vary the duration of heating by providing a plurality of tapped resistors at the output of transistor Q5 of on-off flip-flop circuit 21 (see FIG. 3) and the provision of a selection switch at terminal 34, Also, the temperature levels sensed at terminal 53 of sensing unit 13 (see FIG. 3) can be varied by tapped resistors and selector switches similarly connected to permit different voltage level outputs from terminal 53. By way of further example, the invention is readily applicable to utilization not only with the AC power source illustrated but with a pulsating DC input source and with DC voltage level inputs or to a soldering or other machine.

While salient features have been illustrated and described with respect to particular embodiments, it should be readily apparent that modifications can be made within the spirit and scope of the invention, and it is therefore not desired to limit the invention to the exact details shown and described.

What is claim is;

1. An apparatus for bonding conductive materials, said apparatus comprising;

a. a bonding tip adapted to be heated with an electrical current and having a resistance that increases with increases in temperature;

b. means for heating said bonding tip with current pulses of substantially constant peak amplitude whereby the voltage drop thereacross increases with increases in temperature;

c. means for sensing a predetermined peak voltage across said bonding tip which occurs whenever its temperature rises to a preselected operating temperature, and d. means responsive to said predetermined peak voltage for commencing a work cycle and for controlling said means for heating said bonding tip to maintain the temperature of said bonding tip substantially at said operating temperature during said work cycle.

2. The apparatus of claim 1 wherein said means responsive to said predetermined peak voltage additionally comprises apparatus operative over a range of input line voltage levels for regulating the peak amplitude of said current pulses employed to heat said bonding tip.

3. The apparatus of claim 2, said apparatus operative over a range of input line voltage levels for regulating the peak amplitude of said current pulses employed to heat said bonding tip further comprising:

a. a silicon-controlled rectifier circuit coupled to said means for heating said bonding tip,
b. unijunction transistor means to control the output of said silicon-controlled rectifier circuit,
c. means responsive to said input line voltage for selectively biasing off or biasing on said unijunction transistor means, and
d. a potentiometer to regulate the peak voltage output of said silicon controlled rectifier circuit,
e. means to supply a regulated voltage to said potentiometer,
f. means to supply line voltage to said potentiometer, and
g. means responsive to line voltage amplitude for providing a proper bias time on said unijunction transistor means thereby to regulate said peak amplitude of said current pulses.

4. The apparatus of claim 3 wherein said means for selectively biasing off or biasing on said unijunction transistor means includes:

a. means responsive to said line voltage for generating a series of unidirectional regulated pedestals concurrent with the alternations of said line voltage, and
b. integrating apparatus responsive to said regulated pedestals and connected to said unijunction transistor means thereby to bias said unijunction transistor means on at a selected point during each of said regulated pedestals.

5. The apparatus of claim 3 wherein said means for providing a proper bias time on said unijunction transistor means includes:

means responsive to increases in the line voltage amplitude for delaying said selected point during each of said regulated pedestals, and means responsive to decreases in the line voltage amplitude for advancing said selected point during each of said regulated pedestals thereby to maintain the peak amplitude of said current pulses substantially constant for variations in line voltage amplitude.

6. Apparatus for maintaining a bonding tip which changes electrical characteristics with a change in temperature at an approximately constant preselected operating temperature over a predetermined cycle comprising:

a. means responsive to an AC line voltage for generating a series of electrical pulses across said bonding tip, said electrical pulses constituting successive latter portions sine wave alternations, and
b. means responsive to successive changes in electrical characteristic of said bonding tip corresponding to said bonding tip reaching said preselected operating temperature for arresting the generation of said electrical pulses thereacross for successive predetermined time intervals thereby to maintain said bonding tip substantially at said preselected operating temperature.

7. The apparatus of claim 6, said apparatus further comprising apparatus responsive to the initial change of said successive changes in electrical characteristics corresponding to said bonding tip reaching said preselected operating temperature for initiating timing of a heating cycle.

8. The apparatus of claim 6 additionally including means responsive to the amplitude of said AC line voltage for regulating the duration of said successive latter portions of sine wave alternations during said predetermined cycle in a manner to maintain a substantially constant peak current flow through said bonding tip whereby said changes in electrical characteristics are indications of changes in temperature thereof.

9. The apparatus of claim 1, said means for sensing said predetermined peak voltage across said bonding tip further including means to adjust the sense level of said predetermined temperature.

10. Apparatus for providing a constant temperature over a predetermined period for an element which changes resistance with change in the temperature, said apparatus comprising:

a. first means for sensing the momentary resistance of said element,
b. second means responsive to said first means for actuating a timing cycle of operation,
c. third means for increasing the temperature of said element,
d. fourth means for controlling the activation of said means for increasing the temperature of said element,
e. fifth means responsive to said second means for actuating said fourth means for controlling for the duration of said timing cycle,
f. sixth means responsive to said first means for sensing the momentary resistance of said element corresponding to the temperature of said element upon change from a predetermined desired for initiating a time duration of disabling restoration of said element to said desired temperature,
g. seventh means for combining the output from said sixth means for initiating said time duration of disabling restoration of said desired temperature and the output of said fifth means, and
h. eighth means for coupling said seventh means for combining to said fourth means for controlling thereby to enable activation of said fourth means for controlling in the presence only of an output from said seventh means.

11. A pulsed thermocompression bonder system comprising;

a. a bonding means for applying heat upon contact with electrical elements on a substrate,
b. a sense circuit responsive to a physical characteristic representative of the temperature of said bonding means,
c. a heating transformer coupled to said bonding means for applying heat thereto,
d. adjustable timing pulse forming means responsive to said sense circuit,
e. a control circuit having a transistor for providing selectively substantial and unsubstantial current flow in accordance with the output of said sense circuit for controlling current flow in said heating transformer,
f. a first source of input line voltage coupled to said control circuit,
g. a second source of relatively constant amplitude input voltage pulses,
h. said control circuit comprising a transistor which is normally conductive in nonheating condition of said transformer,
i. a bleeder resistor arrangement disposed between said first source of voltage pulses and ground,
j. means responsive to fluctuations in said first input source voltage for applying a voltage accordingly to said bleeder resistor arrangement,
k. said bleeder resistor arrangement comprising a potentiometer and a plurality of resistors,
l. peak voltage regulating means comprising a diode coupled in series with said first source of line voltage for regulating current flow therethrough corresponding to deviation of line voltage from said first source,
m. a resistor connected in series with said diode at one end and connected at its other end to a junction point in said bleeder arrangement thereby providing voltage corresponding to the change in source voltage at the slider arm of said potentiometer, n. unijunction diode means responsive to said control circuit voltage at the slider arm of said potentiometer for providing a pulse output, o. means for coupling said pulse output when said transistor is providing said at most unsubstantial current flow to said transformer for applying heat to said bonding means, p. a capacitor disposed across said transistor grounded at one end and at the other end coupled to the sliding arm of said potentiometer, q. means for coupling a base of said transistor to said transformer comprising a pulse transformer and a current-rectifying circuit, r. said bleeder resistor arrangement further comprising a resistance path from said second source of voltage pulses to the emitter of said unijunction transistor, such that upon the firing point of said unijunction transistor being exceeded, a connection is made between said transformer, the base of said unijunction transistor coupled to said transformer and the emitter of said unijunction resistor for providing current to said heating transformer for heating said bonding means, s. an on-off flip-flop circuit responsive to said timing pulse forming means, t. an on-off one-shot multivibrator, u. means for simultaneously applying output from said on-off flip-flop and from said on-off one-shot multivibrator to the base of said transistor, said transistor being responsive only to combined output of said on-off flip-flop plus said on-off one-shot multivibrator such that when appropriate output of both are applied simultaneously the base of said transistor is grounded, said transistor having a common emitter for providing nonconduction in the presence of appropriately combined output from said on-off flip-flop and said one-shot multivibrator, such that the absence of conduction through said transistor enables the emitter of said unijunction transistor to be charged positively for enabling pulse output to said pulse transformer.

12. Apparatus operable to heat at least a section of a workpiece to a temperature within a predetermined temperature range and to substantially maintain said section within said range for a predetermined period comprising:

a. means for transmitting heat to said workpiece section formed of material having a detectable state of a physical characteristic functionally related to the temperature of said means for transmitting heat, b. means to detect said state and to provide corresponding signals whenever said state indicates the temperature of said material is at an upper extremity of said temperature range, c. means responsive to alternating current line voltage activatable to heat said means for transmitting heat, d. control means to regulate the initiation, peak and duration of operability of said last-named means activatable to heat said means for transmitting heat, and e. means responsive to the initial corresponding signal to permit continued activation of said control means during said predetermined period and to arrest activation of said control means for selected intervals of time commencing within said predetermined period whenever said corresponding signal is provided thereby to allow the temperature of said material to cool the lower extremity of said temperature range.

13. The apparatus operable to heat a section of a workpiece as defined in claim 12 wherein said control means to regulate the initiation, peak and duration of operation of said means activatable to heat said means for transmitting heat further comprises means responsive to line voltage fluctuations for modifying the phase angle of output conduction thereby to maintain constant peak-to-peak current output.

PO-1050
(5/69)

UNITED STATES PATENT OFFICE
CERTIFICATE OF CORRECTION

Patent No. 3,602,684 Dated August 31, 1971

Inventor(s) Richard G. Friess

It is certified that error appears in the above-identified patent and that said Letters Patent are hereby corrected as shown below:

Col. 2, line 4, "it" should be --its--;
Col. 5, line 27, "to" should be --or--;
line 68, "l" should be --2--.
Col. 9, line 50, after "reference" insert --temperature.
Col. 10, line 1, "I6" should be --Q6--.
Col. 13, line 65, "Connection" should be --Connected--.
Col. 14, line 24, "underground" should be --ungrounded--.
Col. 16, line 35, "OEGG-371-1" should be --#EGG-371-1--.
Col. 17, line 5, "not" should be --no--.
Col. 20, lines 1-5, delete in their entirety.
Col. 21, lines 18-22, delete in their entirety.
line 23, "g." should be --d.--.
line 56, after "portions" insert --of--.

Signed and sealed this 10th day of April 1973.

(SEAL)
Attest:

EDWARD M.FLETCHER,JR.
Attesting Officer

ROBERT GOTTSCHALK
Commissioner of Patents